United States Patent
Pansana et al.

(10) Patent No.: US 9,578,521 B2
(45) Date of Patent: Feb. 21, 2017

(54) METHOD FOR DETERMINING A TRANSMISSION MODE FOR A CELL OF A NODE OF A TELECOMMUNICATION NETWORK

(71) Applicant: VODAFONE IP LICENSING LIMITED, Berkshire (GB)

(72) Inventors: Lorenzo Pansana, Madrid (ES); Andrea De Pasquale, Madrid (ES); Paul Edwards, Madrid (ES)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 14/517,449

(22) Filed: Oct. 17, 2014

(65) Prior Publication Data

US 2015/0208254 A1 Jul. 23, 2015

(30) Foreign Application Priority Data

Oct. 16, 2013 (ES) .................................. 201331527

(51) Int. Cl.
*H04M 3/00* (2006.01)
*H04W 24/02* (2009.01)
*H04B 7/06* (2006.01)

(52) U.S. Cl.
CPC ........... *H04W 24/02* (2013.01); *H04B 7/0689* (2013.01); *H04B 7/0632* (2013.01)

(58) Field of Classification Search
CPC ..... H04W 24/02; H04B 7/0689; H04B 7/0632
USPC ....... 455/418, 449, 452.1, 73; 370/311, 329, 370/392, 235, 230.1, 328, 225, 412
See application file for complete search history.

(56) References Cited

U.S. PATENT DOCUMENTS

| | | | |
|---|---|---|---|
| 6,965,788 B1 | 11/2005 | Barratt et al. | |
| 2010/0284449 A1* | 11/2010 | de Veciana | H04W 52/0261 375/219 |
| 2011/0002410 A1 | 1/2011 | Forenza et al. | |
| 2012/0026865 A1 | 2/2012 | Fan et al. | |
| 2012/0054661 A1* | 3/2012 | Rados | H04L 41/5032 715/772 |
| 2012/0327779 A1 | 12/2012 | Gell et al. | |
| 2013/0225094 A1 | 8/2013 | Mujtaba et al. | |
| 2015/0092673 A1* | 4/2015 | Singh | H04W 28/0215 370/329 |

OTHER PUBLICATIONS

European Search Report dated Aug. 5, 2015 in corresponding European Application No. 14189360.
Partial European Search Report dated Mar. 2, 2015 in corresponding European Application No. 14189360.
Spanish Search Report for ES 201331527 dated Oct. 28, 2014.

\* cited by examiner

*Primary Examiner* — Dhaval Patel
(74) *Attorney, Agent, or Firm* — B. Aaron Schulman, Esq.; Stites & Harbison, PLLC.

(57) ABSTRACT

A method of determining a transmission mode configuration for a cell of a node of a telecommunication network, the node configured to serve a plurality of user devices within the cell, wherein the determination is based on evaluation of at least one condition associated with one or more applications running at one or more user devices served by the cell, the evaluation being against a specific transmission mode configuration.

20 Claims, 7 Drawing Sheets

| Application | Required Throughput |
|---|---|
| Application_1 | App_1_req_thp |
| ... | ... |
| Application_x | App_x_req_thp |

Fig. 1

| User | Application | Application Required Throughput | User Required Throughput |
|---|---|---|---|
| User 1 | Application_1 | App_1_req_thp | User_1_req_thp |
| | ... | ... | |
| | Application_x | App_x_req_thp | |
| ... | ... | ... | ... |
| User x | Application_1 | App_1_req_thp | User_x_req_thp |
| | ... | ... | |
| | Application_y | App_y_req_thp | |

Fig. 2

| User | Application | Application Required Throughput | Scaling factor | User Required throughput |
|---|---|---|---|---|
| User 1 | Application_1 | App_1_req_thp | | User_1_req_thp |
| | ... | ... | | |
| | Application_x | App_x_req_thp | | |
| ... | ... | ... | Scale factor x | ... |
| User x | Application_1 | App_1_req_thp | | User_x_req_thp |
| | ... | ... | | |
| | Application_y | App_y_req_thp | | |

Fig. 3

| User | Application | Application Required Throughput | Scaling factor | User Required Throughput |
|---|---|---|---|---|
| User 1 | Application_1 | App_1_req_thp | App_1_scaling_factor | User_1_req_thp |
| | ... | ... | ... | |
| | Application_x | App_x_req_thp | App_x_scaling_factor | |
| ... | ... | ... | | ... |
| User x | Application_1 | App_1_req_thp | App_1_scaling_factor | User_x_req_thp |
| | ... | ... | ... | |
| | Application_y | App_y_req_thp | App_y_scaling_factor | |

| User | User required throughput | Max SIMO throughput | Max MIMO throughput | Required MIMO transmission? |
|---|---|---|---|---|
| User 1 | User_1_req_thp | User_1_Max_SIMO_thp | User_1_Max_MIMO_thp | YES/NO |
| ... | ... | ... | ... | ... |
| User x | User_x_req_thp | User_x_Max_SIMO_thp | User_x_Max_MIMO_thp | YES/NO |

METHOD FOR DETERMINING A TRANSMISSION MODE FOR A CELL OF A NODE OF A TELECOMMUNICATION NETWORK

FIELD OF THE INVENTION

The present invention refers to wireless communications and more specifically to an intelligent method to determine a transmission mode for mobile communication networks exploiting, among others, the information of the applications running on user devices within a cell.

BACKGROUND OF THE INVENTION

Nowadays, 4G LTE mobile networks have embedded several different transmission modes capable to strongly enhance the user's throughput. One example of such differentiation is between transmitting using SIMO mode (Single Input-Multiple Output) or MIMO (Multiple-input multiple output) mode.

MIMO (Multi-Input Multi-Output) transmission modes are supported by utilizing multiple antennas both at the receiver and at the transmitter side (access node and user equipment, UE). Depending on the number of antennas at the UE and access node sides, different throughput values can be attained by the MIMO transmission mode. Theoretically, the more the antennas, the higher the throughput. The usage of MIMO allows maximum performance but implies the utilization of at least 2 different power amplifiers in the RF part of a NodeB, (while SIMO can be handled with only one power amplifier) and when an amplifier is ON it consumes an amount of energy.

However there may be several users in a cell that do not need the very high peak rate achievable through MIMO mode of operation, and in these cases the overconsumption of energy does not make sense. Since MIMO transmission mode is more costly in terms of energy-consumption with respect to SIMO transmission mode, having an intelligent decision-making process that would apply SIMO mode when certain conditions are met would translate into a more energy-efficient network, as well as in cost savings for telecom operators. For these reasons, some solutions have been proposed in the prior art to optimize the usage of the MIMO mode only in those situations in which a difference (e.g. in terms of cell throughput and/or capacity) is found, considering the trade-off between user experience and energy/OPEX savings.

Most of the existing radio access network (RAN) solutions known so far simply consider the cell load as a parameter to decide if MIMO mode has to be enabled and thus whether a second power amplifier should be switched-on. Typical examples include tracking if in a cell there is at least one user (and accordingly use this information to switch between MIMO/SIMO modes), or deciding that in specific night hours (in which lower traffic is expected) a cell is left in SIMO mode only.

These solutions are very basic as no optimization or trade-off capability is provided to the operator. Therefore, there is a need in the art for optimizing these schemes which further improve the use of MIMO mode in telecommunication networks. The cell energy consumption should be further optimized by using additional user information available, for example, in the nodes, providing therefore a set of intelligent mechanisms that would trigger on and off the MIMO operation mode.

SUMMARY OF THE INVENTION

Against this background, the present invention solves the aforementioned problems of selecting a transmission mode by using mainly additional information (Application and Device Awareness) that would be available in nodes (e.g., LTE nodes), providing therefore a set of intelligent mechanisms that would trigger on and off one transmission mode (MIMO in the preferred embodiment). The method for determining a transmission mode proposed herein is especially useful in 4G LTE (Long Term Evolution) mobile networks differentiating between a single-input multiple-output (SIMO) mode and multiple-input multiple-output (MIMO) mode, but it could be used also in networks using any wireless transmission technology including: networks using 2G radio access technology (GSM, GPRS, EDGE etc.), 3G Technology (UMTS, HSDPA, HSUPA, etc.), as well as WIMAX. In these cases, instead of acting over the eNodeB as in proposed solution, it could be possible acting over the equivalent in said networks (a NodeB, a base station . . . ).

According to one aspect, it is provided a method of determining a transmission mode configuration for a cell of a node of a telecommunication network, the node configured to serve a plurality of user devices within the cell, wherein the determination is based on evaluation of at least one condition associated with one or more applications running at one or more user devices served by the cell, the evaluation being against a specific transmission mode configuration.

The at least one condition may comprise a throughput, and wherein the evaluation comprises:
  comparing a required throughput with a first threshold throughput, the first threshold throughput being a throughput which would be achieved in the event of selecting a first transmission mode configuration; and
  if the required throughput is lower than the first threshold, selecting the first transmission mode configuration for use in the cell.

In the case of the required throughput is equal or higher than the first threshold, the method may further comprise:
  comparing a required throughput with a second threshold throughput, the second threshold throughput being a throughput which would be achieved in the event of selecting a second transmission mode configuration; and
  if the required throughput is lower than the second threshold, selecting the second transmission mode configuration for use in the cell, otherwise, selecting the first transmission mode.

According to another embodiment of the invention, in the case of the required throughput is higher than the first threshold, the method of the invention may further comprise selecting a second transmission mode configuration for use in the cell.

Preferably, the first transmission mode configuration is either a single-input multiple-output (SIMO) configuration or a multiple-input multiple-output (MIMO) configuration. Then the first transmission mode configuration may be a SIMO configuration and the second transmission mode configuration a MIMO configuration, or the first transmission mode configuration may be a MIMO configuration and the second transmission mode configuration a SIMO configuration.

The required throughput may be computed from a throughput required by the one or more applications. According to one embodiment of the proposed method, the computation is an estimation based on either a throughput associated with the one or more applications or an average throughput associated with the one or more applications during a period of time configured by an operator, wherein the average throughput is associated to one or more elements from the following list: the telecommunication network, the cell where the application is running, a user associated with the user device on which the application is running, or the user device where the application is running.

The required throughput may be also computed, according to another embodiment of the proposed method, from a throughput required by one or more user devices, wherein each of the one or more devices may be assigned a group containing the one or more applications running at the respective device, and wherein the throughout required by each of the one or more user devices may be estimated based on the throughputs required by the applications contained in the respective group.

Comparing the required throughput with the first or the second threshold may further comprise weighting the required throughput required by a scaling factor. The scaling factor, according to different embodiments of the invention, may be specific for each application, specific for each user or user device or common for all the one or more applications.

A second aspect of the invention refers to method for classifying one or more applications running at user devices being served by a node of a telecommunication network within a cell, the classification being based on a comparison of a throughput required by the one or more applications with a threshold associated with the cell.

According to one embodiment of the proposed method, the threshold associated with the cell may be determined by an average throughput achieved by a set of the user devices being served within the cell, said set using a first transmission mode. According to another embodiment of the invention, the threshold associated with the cell is determined by an expected throughput associated to one or more of the user devices being served within the cell.

The telecommunication network is a radio network distributed over land areas called "cells", where user devices are connected. The transmission mode is set at cell level. The cells are managed by nodes, being said nodes the hardware that is connected to the telecommunication network and manage one or more cells, (i.e. one eNodeB with 3 cells, at a given point in time, could be running in a first transmission mode on 2 cells and a second transmission mode on one).

An additional step may be included in one embodiment of the invention consisting on determining a transmission mode for the cell of the node based on the classification of the one or more applications, being each of the one or more applications classified according to a transmission mode which would allow the respective application to achieve a required throughput.

Another aspect of the invention refers to an element for use with a node of a telecommunication network serving a plurality of user devices within a cell. The element is configured for performing any one of the methods of claims 1 to 13.

A last aspect of the invention refers to a computer program product comprising computer program code adapted to perform any one of the methods of claims 1 to 13 when said program code is executed on a computing device.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a draw wherein, by way of illustration and not restrictively, the following has been represented.

DETAILED DESCRIPTION

Some embodiments of the present invention will now be described with reference to the aforementioned drawings. It is to be understood that the following embodiments are described by way of example only and should not be taken to necessarily limit the invention in any particular manner.

According to a first embodiment, a method or process is described for, in general terms, selecting a transmission mode for a cell of a node of a telecommunication network, the node configured to serve a plurality of user devices within a cell. It is proposed due to the fact that very often the latest transmission modes offer high peak rates at the expense of wasting amounts of energy that many users do not need for their normal usage of mobile devices. This is an invitation for optimizing the use of transmission modes and restricting the use of those with higher costs of energy only to the cases when they are really needed and the user is going to experiment a difference from another transmission modes.

The proposed method is based on the knowledge by a node of a telecommunication network (e.g., the eNodeB in LTE) of the applications running on the user devices connected to its cells at any point in time. By way of example, the transmission modes are reduced to two options: SIMO and MIMO, but it would be applied to any other transmission modes. The MIMO configuration is considered as an energy inefficient resource state capable to provide very high throughput to a specific set of user devices. At the same time user experience is improved by very high throughput only when using specific applications as video streaming applications or online games in which there is a huge amount of data to be downloaded, with a download lasting several seconds. Therefore, the potential maximum performance offered by MIMO is only seldom effectively usable for users and truly differentiating in terms of user experience.

For instance, smartphone users would most likely not tell the difference between different transmission modes, even between the SIMO and MIMO operation mode, considering the most typical user traffic profiles. This means that energy could be saved by providing an efficient transmission mode, as SIMO, leaving the user experience untouched.

During a first phase there is a determination of which application a certain user device connected to the telecommunication network cell is running at a given point in time. This is covered by other solutions in the prior art and should be taken just as a starting point for the described method. For example, the eNode (hereinafter eNB) can use one or more of the following information:
  i. QCI marking from the core network: each service (application) is characterized by a QCI (Quality Class Indicator). If the operator configures in its core network to mark e.g. Video streaming with QCI 22, the eNB will retrieve this information in the packets coming from a user device running Video streaming and connected to its cell.
  ii. DSCP marking. This is the same concept as above, only the DSCP marking is done not in the core network but in the transport network.
  iii. Deep Packet Inspection (DPI): the eNB inspects the packets of the user plane and understands which service (application) they are referred to.

Figure 1:
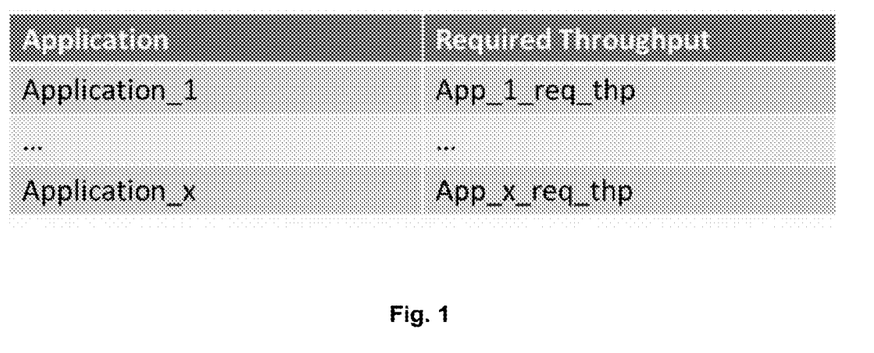
FIG. 1.—shows a lookup table for the eNode B according to an embodiment of the invention.

Once the applications have been determined, the described method determines, for each application running in the cell, its required throughput. According to one embodiment of the invention, the eNB has a lookup table as the one showed in FIG. 1 where, for each application, there is a corresponding value of required throughput. This lookup table may be populated by different ways:
  i. Static table configured by the operator.
  ii. The table is updated every xx seconds based on the statistics collected in the network. Namely, for application App_x the value corresponding to the average throughput recorded in the whole network (e.g. on a OSS basis) in the previous yy hours and associated to App_x is taken.
  iii. The table is updated every xx seconds based on the statistics collected in the cell where the application under exam is running. Namely, for application App_x the value corresponding to the average throughput recorded in the cell where the application is running in the previous yy hours and associated to App_x is taken.
  iv. The table is updated every xx seconds based on the statistics related to the device on which the application is running. Namely, for application App_x the value corresponding to the average throughput recorded on the device where the application is running in the previous yy hours and associated to App_x is taken.
  v. The table is updated every xx seconds based on the statistics collected on the user (MSISDN) that is running the application. Namely, for application App_x the value corresponding to the average throughput recorded on the user (MSISDN) in the previous yy hours and associated to App_x is taken.

The "average" throughput can be computed according to various ways, for example:
  1) each application has its own average throughput computed over a period of time. Thus, if there are for example N applications (in this example and the following let us assume 100 applications), each application will be given a different average throughput $E[T_i]$, for $i=0 \ldots 99$;
  2) each application has a common average throughput based on the actual throughput of each application. Thus, if there are for example 100 applications, the common average throughput could be $$E[T] = \frac{\sum_{i=0}^{99} T_i}{100};$$

3) each application has a common average throughput which is estimated based on the average throughput of each application. Thus, if there are for example 100 applications, the common average throughput could be $$E[T] = \frac{\sum_{i=0}^{99} E[T_i]}{100};$$

Additionally, for the cases where more than one user device/application is present in a cell, the described method may carry out grouping the applications by user device. The eNB maps the applications running in the cell on the user devices that are connected to the cell and later the throughput required by each user device is calculated. Thus, if there is for example one user device with 10 applications, the average throughput for that device could be $$E[T]_D = \frac{\sum_{i=0}^{9} E[T_i]}{10}.$$

Figure 2:
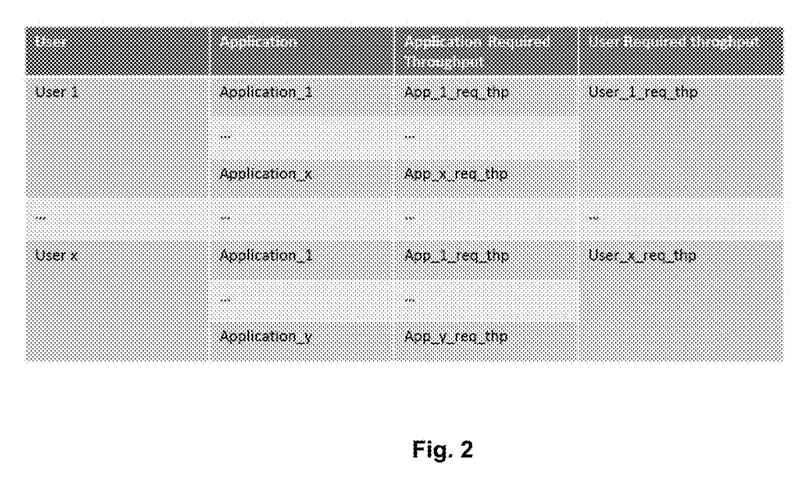
FIG. 2.—shows a lookup table the eNode B and how to populate it according to an embodiment of the invention.
Figure 3:
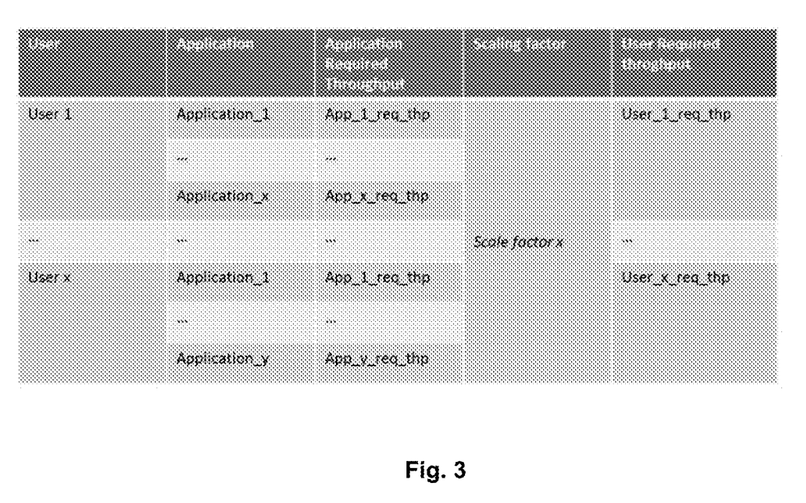
FIG. 3.—shows a table a lookup table the eNode B and how to populate it according to an embodiment of the invention.
Figure 4:
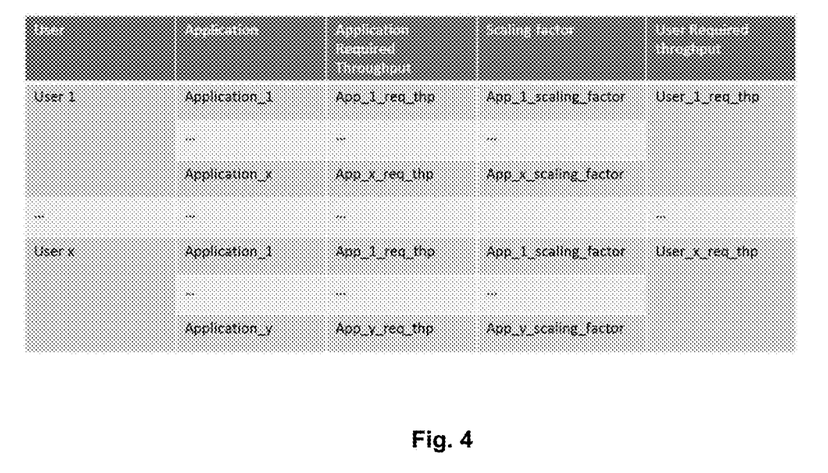
FIG. 4.—shows a table a lookup table the eNode B and how to populate it according to an embodiment of the invention.

Therefore, for each user, a group of applications is defined and the throughput required by each user device may be computed by any one of the following ways:
  i. Summing all the single required throughputs by each application, as it is showed in FIG. 2. Each application is grouped per device, and an average throughput for the device is computed thus, if there is for example a user device with 10 applications, the throughput for that user device could be $$E[T]_D = \frac{\sum_{i=0}^{9} E[T_i]}{10}$$

ii. Statistical multiplexing: the throughput required by each user device is computed by summing up all the throughputs required by each application and multiplying the result by a scaling factor (from 0 to 1) scaling factor x, as it is showed in FIG. 3. That is, each application is grouped per device, and an average throughput for the user device is computed thus, if there is for example a user device with 10 applications, the throughput for that user device could be $$[T]_D = \frac{\sum_{i=0}^{9} E[T_i]}{10} \alpha,$$

where $\alpha$ is the scaling factor, or more specifically, the "statistical multiplexing scaling factor".
  iii. Weighted statistical multiplexing: the throughput required by each user device is computed through the weighted average of the throughputs required by each application, weighted by application_x_scaling_factors. This implementation involves that the lookup table is populated with an extra column, called application scaling factors, where for each application a static scaling factor is included. This is showed in FIG. 4. That is, each application is grouped per device, and an average throughput for the device is computed. Thus, if there is for example a user device with 10 applications, the average throughput for that user device could be $$E[T]_D = \frac{\sum_{i=0}^{9} E[T_i]\beta_i}{10},$$

where $\beta_i$ is the application_x_scaling_factor or more specifically, the "application-specific statistical multiplexing scaling factor"

Given that, in practice, it is not often true that if User "xyz" is running 3 applications with estimated throughput requirement equal, respectively, 10, 2 and 3 Mbps, then the total required throughput is 10+2+3=15 Mbps. In these cases, the dimensioning is usually never done according to the peak throughput (15 Mbps), as it is not realistic to think of time-constant throughput requirements from the applications. In this case, a statistical multiplexing solution gains much importance as it can reduce the overall throughput requirement (e.g. $\alpha$=0.6, therefore the total throughput requirement for User xyz=15*0.6=9 Mbps).

In the case of deciding to use statistical multiplexing, the operator would know how to dimension a. As an example, an LTE eNB with 3 sectors at 15 MHz could theoretically provide a maximum throughput of about 300 Mbps (approx. 100 Mbps per sector), but the dimensioning of the transmission link is never done in practice considering the peak rate, and it would be reasonable to think of using transmission links with a bandwidth around 180 Mbps (therefore $\alpha$=0.6). Therefore, setting the value for "$\alpha$" can be seen as a configurable parameter which depend on the operator's decision.

$\beta_i$ coefficients used for the cases of weighted statistical multiplexing are application-specific. Different applications may require not only different throughputs, but also a different time-distribution of the throughput (e.g., constant, bursty, periodical, etc). For example, a video streaming application would likely require $\beta_i$=1, i.e. a constant stream, while an instant messaging application may require 500 kbps but with $\beta_i$=0.2, accounting for the fact that a bursty traffic is enough for such application. In this case, the operator may have different possibilities of assigning $\beta_i$ values. It has already being mentioned that in the implementation the eNB may have a sort of look-up table where there is one row per application, columns containing the estimated throughput and also the $\beta_i$ values. These values can be assigned as follows:

1. The operator manually inserts them.
2. Exactly as for the throughput estimation, the A values can be derived from statistics collected on the one or more applications at a cell level, network level, and user device level.

Now, the eNB knows the required throughput for each user device connected to its cell.

Figure 5:
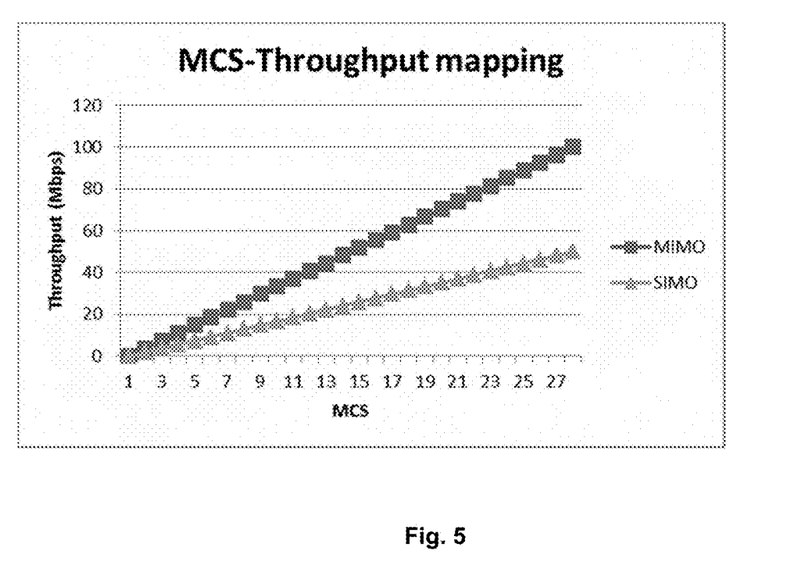
FIG. 5.—shows a curve of a Modulation-Coding-Scheme to estimate the radio conditions.

To calculate the maximum throughput that could be given by the eNB according to different transmission modes, the radio conditions have to be taken into account. According to this embodiment, the parameter used to estimate the radio conditions is the MCS (Modulation-Coding-Scheme), that is known by the eNB (as it is assigned by the scheduler to each user device). The eNB determines, for each user device, the maximum throughput achievable using SIMO mode as transmission mode for the cell (Max_SIMO_thp) and the maximum throughput achievable using MIMO mode as transmission mode for the cell (Max_MIMO_thp), for example by using a lookup table based on the curve showed in FIG. 5. As there may be other user devices in the cell, the final values of Max_SIMO_thp and Max_MIMO_thp are determined by dividing the values contained in the lookup table by the number of user devices.

Figure 6:
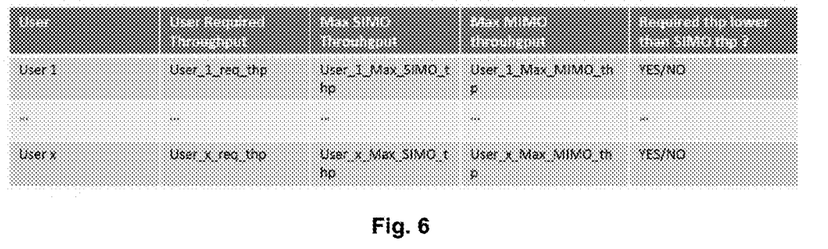
FIG. 6.—shows a table for the decision of the eNodeB according to an embodiment of the invention.
Figure 7:
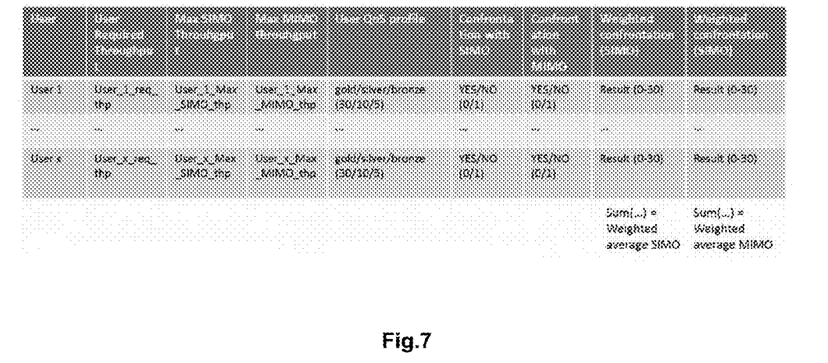
FIG. 7.—shows a table for the decision of the eNodeB according to an embodiment of the invention.

Finally, once all the previous steps have been carried out and the eNB knows, for each user device connected to the cell, his required throughput (User_x_req_thp), maximum throughput achievable using SIMO (Max_SIMO_thp) and) and maximum throughput achievable using MIMO (Max_MIMO_thp), the decision whether to opt for SIMO transmission mode or MIMO transmission mode has to be taken by the eNB, based on the confrontation of these values. The decision may be based on one of the following embodiments:

i. For each user device, it is verified whether User_x_req_thp is lower than (Max_SIMO_thp* tolerance_value), where tolerance_value is an operator configurable percentage. As it is showed in FIG. 6, if the condition is met, the user device is flagged with "YES". If all user devices are flagged with YES, then the SIMO mode is activated (as it means that the throughput requirement of each singular user device will be fulfilled in SIMO mode). Otherwise, the user is flagged with "NO". The required throughput of all user devices flagged with "NO" is then confronted considering this time the Max_MIMO_thp. If the number of "NO" is now zero when confronting the user devices with Max_MIMO_thp, the MIMO mode is activated, otherwise if there is at least one "NO" SIMO is used, because if even activating MIMO is not sufficient to strongly improve the situation, then it is better to use SIMO for energy saving reasons.

ii. This alternative embodiment is almost the same as above, but the condition is that, instead of activating MIMO when at least one user device is requiring more throughput than the achievable in SIMO, now there is a threshold of user devices. This threshold represents the maximum tolerated number of user devices that require a throughput higher than that provided by the SIMO transmission mode. If there are at least a number of user devices "xx" flagged with "NO" after the confrontation with their Max_SIMO_thp, the eNB does the same confrontation for these user devices considering this time the Max_MIMO_thp. If the number of "NO" is now, in the confrontation with Max_MIMO_thp, lower than a second threshold of number of user devices, the MIMO mode is activated; otherwise SIMO is used for the same energy saving reasons than above.

iii. Another alternative embodiment set a percentage of user devices to evaluate if the confrontation has to be made with Max_MIMO_thp. Thus, the condition is that if there is at least a xx % of user devices flagged with "NO", the eNB does the same confrontation considering this time the Max_MIMO_thp as a comparison threshold. If the number of "NO" is now lower than a second percentage of user devices xx %, the MIMO mode is activated, otherwise SIMO is used.

iv. Another embodiment of proposed invention may comprise considering a Quality of Service (QoS) profile (for example bronze, silver and gold) in order to weight each user or user device. The operator assigns the QoS profile to the users or user devices, which are weighted according to their QoS profile. It is shown in FIG. 7.

In this particular case, each "YES" count as 0, and "NO" as 1. Each QoS profile is given a weight, e.g. bronze=5; silver=10; gold=30. Thus, each YES/NO can therefore be weighted with the QoS profile and the weighted average (weighted_average_SIMO) is computed and compared to a threshold. If the weighted average is greater than the threshold, also the weighted_average_MIMO is computed. If weighted_average_MIMO is lower than the threshold, the cell is commanded to use SIMO transmission mode, otherwise MIMO.

For instance, if the threshold were set to 19, it would mean that the MIMO mode would be triggered if at least one of the following conditions is met (assuming that weighted_average_MIMO is lower than 19 since there are less "NO" in the MIMO column):
(1) There is one gold user device whose required throughput is lower than the maximum SIMO throughput provided to them.
(2) There are at least 2 silver user devices whose required throughput is lower than the maximum SIMO throughput provided to them.
(3) There are at least 4 silver user devices whose required throughput is lower than the maximum SIMO throughput provided to them.

v. Another embodiment of the invention computes, for each user device, the differences between User_x_req_thp and User_x_Max_SIMO_thp and User_x_Max_MIMO_thp. The differences between User_x_Max_SIMO_thp that are negative (i.e. the SIMO mode does not provide enough throughput) are summed up. If the sum is greater than a threshold, also the negative differences between User_x_req_thp and User_x_Max_MIMO_thp are summed up. If this sum is lower than threshold, MIMO mode is used, otherwise SIMO mode is used.

vi. As a modification of the previous embodiment, an additional step may be included of weighting the sum by the QoS profile of the user devices.

The described method may be applied iteratively or setting some conditions that trigger it when they are met. For example, the method can be triggered when a user device enters or exits the cell (i.e. RRC connection setup or RRC connection release); or when an application is opened or closed; or when a timer previously set is expired.

One embodiment of the proposed method consists on simplifying the decision making in those cases where nor the SIMO achievable throughput nor MIMO achievable throughput are enough to satisfy the throughput required by each user device. In those cases SIMO mode would be preferred as not even MIMO would satisfy throughput requirements, therefore SIMO is used to achieve better energy saving results. However, another embodiment of proposed method covers the particular case that MIMO would anyway allow performances closer to those required by the user devices, thus MIMO mode is used.

In order to clarify the algorithm a complete example it is provided below. It is assumed in this example that there are three user devices connected to cell 1 of the eNB xxx, being the cells of eNB xxx called 1, 2 and 3. It is assumed that user device 1 is running two applications of web browsing and video streaming; user device 2 is running an application of e-mail and user device 3 is running two applications of instant messaging and file downloading.

The eNB knows that such applications are running on its cell 1 thanks to the information provided by the application-awareness, by using one of the embodiments described above (e.g. QCI marking). The eNB will also be able to map each application to the user device upon which the said application is running, for instance using the information included in the LTE radio bearer associated to each user device).

At this point, the eNB estimates the throughput required by each user device. To do this, first it is necessary to estimate the throughput required by each application. This can be done by reading a table where the estimated throughput required per each application is reported. The table is filled following one of the above mentioned embodiments. For instance, it can be filled using the statistics of the whole network related to the specific application. For this example, the eNB has reconstructed the following values:

Web browsing needs 0.5 Mbps
Video streaming needs 2 Mbps
Email needs 0.7 Mbps
Instant messaging needs 0.4 Mbps
File download needs 5 Mbps This information is now used to compute the throughput required by each user, according to one of the embodiments described above. For instance, it is assumed that the "weighted statistical multiplexing" is used, and that the weights associated to the applications are the following:

Web browsing: 55%
Video streaming: 85%
Email: 35%
Instant messaging: 28%
File download: 70

Again, these values can be retrieved by the eNB following the same embodiment used to estimate the throughput required by each application (e.g. network statistics).

At this point, the throughput required by each user device is estimated by calculating the weighted average of the applications running on each single user device. This would yield the following values:

U1_required_throughput=1,975 Mbps
U2_required_throughput=0,245 Mbps
U2_required_throughput=3,612 Mbps Now the eNB needs to calculate, for each user device, its associated maximum achievable SIMO throughput and maximum achievable MIMO throughput. This calculation will be based on the knowledge of the radio conditions of all user devices (e.g. CQI) as well as the number of user devices served by cell 1 of eNB xxx. Let us assume that the evaluation yields the following result:

U1_SIMO_thp=2 Mbps; U1_MIMO_thp=4 Mbps
U2_SIMO_thp=1.5 Mbps; U2_MIMO_thp=3 Mbps
U1 SIMO_thp=2 Mbps; U1_MIMO_thp=4 Mbps At this point, the eNB carries out the condition evaluation phase by comparing the throughput required by each user device to its corresponding maximum SIMO and MIMO throughput.

For the above mentioned case, the results are the following:

User device 1
U1_SIMO_thp>U1_required_throughput? YES
U1_MIMO_thp>U1_required_throughput? YES
User device 2
U2_SIMO_thp>U2_required_throughput? YES
U2_MIMO_thp>U2_required_throughput? YES
User device 3
U3 SIMO_thp>U3_required_throughput? NO
U3 MIMO_thp>U3_required_throughput? YES Note that, whenever the first evaluation (SIMO vs required) yields a YES, the second evaluation (MIMO vs required) is not necessary according to the described embodiment, but it is reported here for the sake of completeness.

Also, for the sake of simplicity, no tolerance value was considered in this example (in practice this could be used to relax the evaluation of the throughput requirement).

All the above mentioned phases of the example are summarized in the following table:

|  | User device 1 |  | User device 2 |  | User device 3 |  |
|---|---|---|---|---|---|---|
| Running applications: | web_browsing video_streaming |  | e_mail |  | instant_msg file_download |  |
| Application throughputs (Mbps) | web_browsing video_streaming | 0.5 2 | e_mail | 0.7 | instant_msg file_download | 0.4 5 |
| Application weights | web_browsing video_streaming | 55% 85% | e_mail | 35% | instant_msg file_download | 28% 70% |
| User device throughput | U1_Required_thp | 1.975 | U2_Required_thp | 0.245 | U3_Required_thp | 3.612 |
| QoS class | Bronze |  | Bronze |  | Gold |  |
| Achievable throghputs | U1_SIMO_thp U1_MIMO_thp | 2 4 | U2_SIMO_thp U2_MIMO_thp | 1.5 3 | U3_SIMO_thp U3_MIMO_thp | 2 4 |
| Evaluation | Tolerance value U1_SIMO_thp > U1_Required_thp? U1_MIMO_thp > U1_Required_thp? | 0% YES YES | Tolerance value U1_SIMO_thp > U1_Required_thp? U1_MIMO_thp > U1_Required_thp? | 0% YES YES | Tolerance value U1_SIMO_thp > U1_Required_thp? U1_MIMO_thp > U1_Required_thp? | 0% NO YES |

Now there is the decision-making phase. Depending on what method is chosen, among the embodiments described above and how it is parameterized, a different choice will be taken by the eNB. Different decision-making embodiments are considered in the following:

According to the first decision-making embodiment, this is the logic followed by the eNB:
1. How many user devices are flagged with "NO" to the first question (SIMO vs required)?
2. If there is none, use SIMO
3. If there is at least 1, go to next step
4. How many user devices are flagged with "NO" to the second question (MIMO vs required)?
5. If there is none, use MIMO
6. If there is at least 1, use SIMO It is clear that in this example, MIMO mode would be used as there is 1 user device whose throughput requirement is satisfied in MIMO mode only.

According to the second decision-making embodiment, this is the logic followed by the eNB:
1. How many user devices are flagged with NO to the first question (SIMO vs required)?
2. If there is less than xxx, use SIMO
3. If there is at least xxx, go to next step
4. How many user devices are flagged with "NO" to the second question (MIMO vs required)?
5. If there is less than yyy, use MIMO
6. If there is at least yyy, use SIMO If xxx and yyy are equal to 1, it is clear that the first and second embodiments coincide. Assuming that xxx equals to 2, SIMO would be used. The parameters xxx and yyy are used to regulate the tolerated number of user devices that have their throughput requirements not satisfied by SIMO.

According to the third decision-making embodiment, this is the logic followed by the eNB:
1. How many user devices are flagged with "NO" to the first question (SIMO vs required)?
2. If there is less than a percentage xxx % of users devices being served within the cell, use SIMO
3. If there is at least the percentage xxx % of user devices, go to next step
4. How many user devices are flagged with NO to the second question (MIMO vs required)?
5. If there is less than a percentage yyy %, use MIMO
6. If there is at least the percentage yyy %, use SIMO If xxx % and yyy % are equal to 100%, it is clear that the first and second embodiments coincide. Otherwise, assuming for example that xxx % equals to 40%, SIMO would be used. Parameters xxx % and yyy % are used to regulate the tolerated percent share of user devices that have their throughput requirements not satisfied by SIMO. If xxx % were equal to 10%, MIMO would be used regardless of the value assigned to yyy % (as in the example all users are flagged with YES after the second confrontation—MIMO vs required)

According to the fourth decision-making embodiment, also the QoS class of each user device is taken into account, and a weight is assigned to each QoS class. Assuming that:
  U1 is Bronze, with weight 5
  U2 is Silver, with weight 10
  U3 is Gold, with weight 20

At this point, the first condition is evaluated (SIMO vs required). Each "YES" will be weighted according to the QoS class of the corresponding user device, while each "NO" will be discarded. Then all singular weights will be added up. In the example, there is only one "NO" for a Gold user devices, therefore the total score is 20.

This score is compared to a threshold; if the score is higher than the threshold, MIMO will be used; if not, SIMO will be used. Hence, the lower the threshold, the easier it will be for the algorithm to decide to use MIMO, and vice versa. For instance, assuming that the threshold is for example 19, in this case, MIMO is used. Otherwise, if the threshold were for example 30, SIMO would be used.

According to the fifth embodiment, the Boolean "YES" vs "NO" is abandoned in favour of the actual throughput gaps, as reported in the following figure:

| Evaluation with thp gaps | Tolerance value U1_SIMO_thp > U1_Required_thp U1_MIMO_thp > U1_Required_thp? | 0% 0.025 2.025 | Tolerance value U1_SIMO_thp > U1_Required_thp? U1_MIMO_thp > U1_Required_thp? | 0% 1.255 2.755 | Tolerance value U1_SIMO_thp > U1_Required_thp? U1_MIMO_thp > U1_Required_thp? | 0% −1.612 0.388 |

In this case, the negative results of the first evaluation (i.e. where SIMO is not sufficient) are summed up. In the example, the sum equals to −1,612 Mbps. This value is compared to a threshold: if it is higher, SIMO is used. If it is lower, the negative results of the second evaluation (i.e. where MIMO is not sufficient) are summed up and compared to the threshold. If it is still lower, not even MIMO can provide sufficient throughput and SIMO is used for energy saving reasons. If the sum is higher, MIMO is used. In the example, it is assumed that the threshold is equal to −1 Mbps. The first sum equals −1,612 therefore the second condition is evaluated. Now the second sum equals zero, which is higher than the threshold, therefore MIMO is used.

According to the sixth embodiment, the same mechanism is performed but this time also QoS classes are taken into account as weighting factors. Assuming that the weights for this example are:

20% for Bronze
50% for Silver
100% for Gold

As in the example user device 3 is a Gold user, this case is exactly the same as the one described in the fifth embodiment. Assuming that user device 3 is a Bronze user, its contribution is downweighted by 50%. In this case, the first sum equals −0,806 Mbps which is higher than the threshold −1 Mbps, therefore SIMO is used.

The invention claimed is:

1. A method of determining a transmission mode configuration for a cell of a node of a telecommunication network, the node configured to serve a plurality of user devices within the cell, the method comprising:
   performing an evaluation of at least one condition associated with one or more applications running at one or more user devices served within the cell against a specific transmission mode configuration; and
   determining a transmission mode configuration for the cell based on the evaluation of the at least one condition against the specific transmission mode configuration.

2. A method according to claim 1, wherein the at least one condition comprises a throughput, and wherein the evaluation comprises:
   comparing a required throughput with a first threshold throughput, the first threshold throughput being a throughput which would be achieved in the event of selecting a first transmission mode configuration; and
   if the required throughput is lower than the first threshold, selecting the first transmission mode configuration for use in the cell.

3. A method according to claim 2, wherein if the required throughput is equal or higher than the first threshold, the method further comprises:
   comparing the required throughput with a second threshold throughput, the second threshold throughput being a throughput which would be achieved in the event of selecting a second transmission mode configuration; and
   if the required throughput is lower than the second threshold, selecting the second transmission mode configuration for use in the cell, otherwise, selecting the first transmission mode.

4. A method according to claim 2, wherein if the required throughput is higher than the first threshold, the method further comprises:
   selecting a second transmission mode configuration for use in the cell.

5. A method according to claim 2, wherein the first transmission mode configuration is either a single-input multiple-output (SIMO) configuration or a multiple-input multiple-output (MIMO) configuration.

6. A method according to claim 3, wherein the first transmission mode configuration is a SIMO configuration and the second transmission mode configuration is a MIMO configuration, or wherein the first transmission mode configuration is a MIMO configuration and the second transmission mode configuration is a SIMO configuration.

7. A method according to claim 2, wherein the required throughput is computed from a throughput required by the one or more applications.

8. A method according to claim 7, wherein the computation is an estimation based on either a throughput associated with the one or more applications or an average throughput associated with the one or more applications during a configured period of time, wherein the average throughput is associated to one or more elements from the following list: the telecommunication network, the cell where the application is running, a user associated with the device on which the application is running, or the user device where the application is running.

9. A method according to claim 2, wherein the required throughput is computed from a throughput required by one or more user devices.

10. A method according to claim 9, wherein each of the one or more user devices is assigned a group containing the one or more applications running at the respective device, and wherein the throughout required by each of the one or more user devices is estimated based on the throughputs required by the applications contained in the respective group.

11. A method according to claim 2, wherein comparing the required throughput with the first or the second throughput threshold further comprises:
   weighting the required throughput by a scaling factor, being the scaling factor one of: a specific factor for each application, a specific factor for each user or user device; or a factor common for all the one or more applications.

12. A method of classifying one or more applications running at a plurality of user devices being served by a node of a telecommunication network within a cell, the method comprising:
   performing a comparison of a throughput required by the one or more applications with a threshold associated with the cell; and
   classifying the one or more applications running at the plurality of user devices being served by the node based on the comparison of the throughput required by the one or more applications with the threshold associated with the cell.

13. A method according to claim 12, wherein the threshold associated with the cell is determined by an average throughput achieved by a set of the user devices being served by the node within the cell, said set using a first transmission mode.

14. A method according to claim 13, wherein the threshold associated with the cell is determined by an expected throughput associated with one or more of the user devices being served by the node within the cell.

15. A method according to claim 12, wherein each of the one or more applications is classified according to a transmission mode which would allow the respective application to achieve a required throughput.

16. A method according to claim 15, further comprising determining a transmission mode for the cell of the node based on the classification of applications.

17. A computer apparatus for use with a node of a telecommunication network, said node serving a plurality of user devices within a cell, the computer apparatus comprising:
- a processor, and a memory storing computer readable instructions for execution by the processor to perform a method of classifying one or more applications running at the plurality of user devices being served by the node within the cell, and wherein the method comprises:
  - performing a comparison of a throughput required by the one or more applications with a threshold associated with the cell; and
  - classifying the one or more applications running at the plurality of user devices being served by the node based on the comparison of the throughput required by the one or more applications with the threshold associated with the cell.

18. A non-transitory computer-readable storage medium comprising computer-executable program code stored thereon that is executable by a processor to perform the method of claim 12.

19. A computer apparatus for use with a node of a telecommunication network, said node serving a plurality of user devices within a cell, the computer apparatus comprising:
- a processor, and a memory storing computer readable instructions for execution by the processor to perform a method of determining a transmission mode configuration for the cell, and wherein the method comprises:
  - performing an evaluation of at least one condition associated with one or more applications running at one or more user devices served within the cell against a specific transmission mode configuration; and
  - determining a transmission mode configuration for the cell based on the evaluation of the at least one condition against the specific transmission mode configuration.

20. A non-transitory computer-readable storage medium comprising computer-executable program code stored thereon that is executable by a processor to perform the method of claim 1.

* * * * *